United States Patent [19]

Hikami et al.

[11] Patent Number: 5,497,437
[45] Date of Patent: Mar. 5, 1996

[54] METHOD AND APPARATUS FOR RECEIVING LIGHT WITH A MODULATED POLARIZATION

[75] Inventors: Toshiya Hikami; Shoichi Negami; Shigeaki Nishikawa; Matsue Murata, all of Tokyo, Japan

[73] Assignee: The Furukawa Electric Co., Ltd., Tokyo, Japan

[21] Appl. No.: 354,735

[22] Filed: Dec. 6, 1994

[30] Foreign Application Priority Data

Dec. 6, 1993 [JP] Japan .................... 5-339691

[51] Int. Cl.[6] .................................................. G02B 6/126
[52] U.S. Cl. .................... 385/11; 385/4; 385/15; 359/303
[58] Field of Search .................... 385/11, 4, 12, 385/15, 31, 32, 33; 359/303

[56] References Cited

U.S. PATENT DOCUMENTS 5,136,599  8/1992  Wilcox .................... 385/31 X
5,361,270  11/1994  Heismann .................... 385/11 X Primary Examiner—John D. Lee
Assistant Examiner—Phan T. H. Palmer
Attorney, Agent, or Firm—Jacobson, Price, Holman & Stern

[57] ABSTRACT

There is provided a method for modulating the polarization of light that allows detection of any modulated output regardless if the optical analyzers are rigidly held in place. According to a first aspect of the invention, a method for receiving light with a modulated polarization comprises steps of dividing the light being propagated through an optical fiber 1 with a polarization modulated in accordance with a modulation signal into three branched beams, causing one of the branched beams of light with a modulated polarization to pass through a π/2 phase corrector 2 and a first optical analyzer 3a and causing the remaining branched beams of light to respectively pass through second and third optical analyzers 3b and 3c without passing through any π/2 phase correctors before in order to receive light with a modualted intensity from the optical analyzers 3a, 3b and 3c. According to a second aspect of the invention, an apparatus for receiving light with a modulated plane is provided, said second optical analyzer 3b and said third optical analyzer 3c forming an angle of 49° therebetween.

2 Claims, 9 Drawing Sheets

METHOD AND APPARATUS FOR RECEIVING LIGHT WITH A MODULATED POLARIZATION

BACKGROUND OF THE INVENTION

1. Field of the Invention

This invention relates to a method and an apparatus for receiving light with a modulated polarization being propagated through an optical fiber.

2. Prior Art

Direct modulation is a technique for modulating light waves that has popularly been used for optical telecommunications. With direct modulation, the electric current being applied to a light source, which is typically a semiconductor laser device or a light emitting device, is modified in a controlled manner to modulate the output of the light source. However, indirect modulation, with which light (coming from a DC light source and) being propagated through an optical fiber is indirectly modulated by externally applying electric signals to the light by means of an optical external modulator, is increasingly gaining popularity in recent years.

There has been proposed a type of optical external modulator that utilizes acoustic optical effects. The (a) in FIG. 8 illustrates such an optical external modulator comprising an about 1 mm thick quartz glass substrate 41, an optical fiber 1 arranged on a surface of the substrate 41 and rigidly bonded thereto by means of an adhesive agent 43 of burnt granulous quartz glass and a piezoelectric device 49 arranged on the surface of the substrate 41 opposite to that of the optical fiber 1 and formed by sequentially laying a lower electrode 49, a piezoelectric film 46 and an upper electrode 47 to produce a multilayer structure as shown in (b) of FIG. 8.

When a high-frequency signal is applied between the lower electrode 49 and the upper electrode 47 of the piezoelectric device 49, the piezoelectric film 46 is driven to vibrate and generate a supersonic sound wave, which is then fed to the optical fiber 1 to locally modify the refractive index of the inside of the optical fiber 1 so that consequently the polarization of the light being propagated through the optical fiber 1 is modulated as a function of the applied high frequency signal.

The light passing through the optical fiber 1 can be received by means of an optical analyzer 29 comprised in a light receiving system and converted to light whose intensity is modulated as illustrated in FIG. 9. The conversion from light with a modulated polarization to light with a modulated intensity takes place with an efficiency that is highly dependent on the state of polarization of the light that strikes the optical analyzer 29 and therefore the angular position of the polarizer 25 and that of the optical analyzer 29 need to be rigorously controlled for optimization.

Methods have been proposed for effectively and efficiently converting light with a modulated polarization into light with a modulated intensity without modifying the angular position of the optical analyzer. Japanese Patent Application Laid-Open Publication No. Hei 3-206413 discloses such a method. With the disclosed method, the light transmission path is branched by a fusion-type optical waveguide coupler 70 so that the light branched by the coupler 70 is received by a pair of optical analyzers 29, 29 that are arranged at the respective output ports of the coupler 70 as illustrated in (a) of FIG. 10. The light transmission path can be divided into three or more than three branches by arranging two or more than two couplers 70 as illustrated in (b) of FIG. 10. A quarter-wavelength plate 72 may be inserted between one of the output ports of the coupler 70 and the corresponding optical analyzer 29 in order to give rise to a phase-difference bias as shown in (c) of FIG. 10. With any of the above arrangements, the signal transmitted through the path may be located at one of the ports with a high probability.

Problems to be Solved by the Invention

The above described known methods of modulating the polarization light is, however, accompanied by the following problems.

(1) The method of modulating the polarization of light as described above by referring to FIG. 9, where the angular position of the optical analyzer 29 is optimized, requires the modulation output to be fed back to the optical analyzer 29. A modulation system incorporating such a feed-back scheme would inevitably be large and practically not feasible.

(2) The method of modulating the polarization of light as described above by referring to FIGS. 10(a), 10(b) and 10(c) have proved to be unsatisfactory because the angular positions of the optical analyzers and the quarterwavelength plate 72 are not defined in the document. This will be discussed below.

Assume a plane perpendicular to the axis of light being propagated through an optical fiber and two components of polarization that are contained within the plane axed independent from each other. If an ultrasonic wave is being propagated along a y-axis and the amplitudes of the light wave along x-and y-axes are Ex and Ey respectively, they are expressed by respective equations as shown below.

$$Ex = E_1 \cos\theta \times exp\, j(\omega t - \beta xZ) \quad (1) \text{ and}$$

$$Ey = E_1 \sin\theta \times exp\, j(\omega t - \beta yZ + \psi) \quad (2),$$

where $E_1$ is the electric field of the incident polarized light wave and is the angle formed by the polarized light (linearly polarized light) and the x-axis when the phase difference $\omega$ between Ex and Ey is equal to 0.

Equation (3) below is obtained by eliminating the time-dependent terms from the equations (1) and (2) above.

$$[Ex/(E_1\cos\theta)]^2 + [Ey/(E_1\sin\theta)]^2 - \\ 2[Ex/(E_1\cos\theta)][Ey/(E_1\sin\theta)] \times \cos(\psi \pm \Delta\psi) = \sin^2\Delta\psi, \quad (3)$$

where $\psi + (\beta_x - \beta_y)_z$ is expressed by $\psi \pm \Delta\psi$, $\pm$ being the variation in the polarized light.

Electric field E of the polarized light received by the optical analyzer is expressed by equation (4) below, where is the angle between the operating direction of the optical analyzer and the x-axis.

$$E = E_1\{\sin^2\theta \times \sin^2 + \sin 2\theta \times \sin\phi \times \cos\phi - \cos(\psi \pm \Delta\psi) + \cos^2\theta \times \cos^2\psi\}^{0.5} \quad (4)$$

The modulation output of the above system is given by the difference between the value of electric field $E_2$ for $\psi+\Delta\psi$ and that of electric field $E_1$ for $\psi-\Delta\psi$. In view of the fact that the O/E converter is a square law detector. The modulation output V is expressed by equation (5) below.

$$V = \sin 2\theta \times \sin 2\phi \times \sin\psi \times \sin\Delta\psi \quad (5)$$

From the equation (5) above, it is understood that the optical analyzer is not effective for the detection of light with a modulated polarization when its operating direction is found in any of $\theta=0°, 90°, 180°, \ldots$ or the direction along which an ultrasonic wave is propagated or a direction perpendicular to that direction, nor the analyzer is effective for detecting with a modulated polarization, if the modulation is focused on linear polarization ($\psi=0$). Note that the modulation output of the above system is equal to 0 when $\theta=0°, 90°, 180°\ldots$, or when linear polarization parallel or vertical to the axis of propagation of the ultrasonic wave is involved.

While the propagated light is branched and received by a plurality of optical analyzers 29 in (a) and (b) of FIG. 10, the operating directions of all the optical analyzers 29 can be found in any of $\theta=0°, 90°, 180°,\ldots$ if the optical analyzers 29 are not rigorously regulated for angular position. On the other hand, the arrangement of (c) of FIG. 10 is incomplete because it uses a single optical analyzer 29. Additionally, with the arrangements of (a) and (b) of FIG. 10, the output would be 0 if light with a modulated polarization having an invariable axis of polarization and a mode of modulation focused on liner polarization is introduced to the system.

From the above discussion, it is clear now that any of the arrangements of FIGS. 10(a), 10(b) and 10(c) are not satisfactory for resolving the problem of undetectable state of polarization (hereinafter referred to a null point).

In view of the above problems, it is therefore an object of the present invention to provide a method and an apparatus for receiving light with a modulated polarization that can detect any modulation output of an optical external modulator by means of optical analyzers that are rigidly held in position.

SUMMARY OF THE INVENTION

According to a first aspect of the invention, the above object is achieved by providing a method for receiving light with a modulated polarization comprising steps of dividing the light being propagated through an optical fiber 1 with a polarization modulated in accordance with a modulation signal into three branched beams, causing one of the branched beams of light with a modulated polarization to pass through a π/2 phase corrector 2 and a first optical analyzer 3a and causing the remaining branched beams of light to respectively pass through second and third optical analyzers 3b and 3c without passing through any π/2 phase correctors before in order to receive light with a modulated intensity from the optical analyzers 3a, 3b and 3c.

According to a second aspect of the invention, the above object is achieved by providing an apparatus for receiving light with a modulated polarization comprising a light receiving section 4 including branching devices 5a and 5b for dividing the light with a modulated polarization being propagated through an optical fiber 1 into three branched beams of light 6a, 6b and 6c, a π/2 phase corrector 2 arranged on one of the path of one of the three branched beams of light, for instance 6a, an optical analyzer 3a arranged downstream to the π/2 phase corrector 2, a pair of optical analyzers 3b and 3c arranged on the respective paths of the remaining branched beams of light 6b and 6c, said π/2 phase corrector 2 and said first optical analyzer forming an angle of 45° therebetween, said second optical analyzer 3b and said third optical analyzer 3c forming an angle of 45° therebetween.

The angle of 45° with regard to the optical analyzers 3a, 3b and 3c is not a spherical angle but an angular direction along which the optical analyzers become most sensitive to polarized light (direction that is parallel to the major axis and vertical to the direction of propagation of light).

Function

As a method for receiving light with a modulated polarization according to the first aspect of the invention comprises steps of dividing the light being propagated through an optical fiber 1 with a polarization modulated into three branched beams, causing one of the branched beams of light with a modulated polarization to pass through a π/2 phase corrector 2 and a first optical analyzer 3a and causing the remaining branched beams of light to respectively pass through second and third optical analyzers 3b and 3c without passing through any π/2 phase correctors before in order to receive light with a modulated intensity from the optical analyzers 3a, 3b and 3c, the light being propagated can always be modulated in accordance with a modulation signal applied thereto if the optical analyzers are rigidly held in place. The theory underlying this method will now be described below by referring to FIGS. 5 and 6.

FIG. 5 shows a state of polarization of light being propagated by means of a Poincare sphere as viewed on the surface of the Poincare sphere. Assume that a modulated polarization as indicated by a in FIG. 5 is involved in an optical external modulator 11 as illustrated in FIG. 1. Light with a modulated polarization indicated by a in FIG. 5 can move to different spots on the surface of the Poincare sphere because the state of polarization of the light is subjected to changes as a result of changes, if slight, in the refractive index of the optical fiber 1 as well as changes in ambient temperature and other factors as light proceeds from the optical external modulator 11 to the light receiving section 4.

Assume now light with a modulated polarization as indicated by b in FIG. 5. It is a beam of light having an elliptic plane of polarization having a major axis with an angle of 0° as shown in (a) of FIG. 6. Then, an optical analyzer arranged with an angle of 45° or 135° relative to the x-axis in (a) of FIG. 6 (as the optical analyzer 3b in FIG. 2) cannot produce light having a modulated intensity because the intensity of light of the optical analyzer is always held to a constant level. The sensitivity of the optical analyzer is maximized when its axis forms 0° or 90° with the x-axis (as in the case of the optical analyzer 3c of FIG. 2) and the light that has passed through the optical analyzer 3c produces light with an intensity that is modulated as a function of the signal applied by the optical external modulator 11.

Assume then light with a modulated polarization as indicated by c in FIG. 5. It is a beam of light having an elliptic plane of polarization having a major axis with an angle of 45° as shown in (b) of FIG. 6. Unlike the above described case, the light that has passed through the optical analyzer 3b of FIG. 2 is a beam of light having a modulated, whereas the beam of light that has passed through the optical analyzer 3c does not contain any component of the applied signal. In most cases, both of the beams of light that have passed respectively through the optical analyzers 3c and 3b contain a certain component of the applied signal.

In the case of d in FIG. 5, where the major axis is held unchanged and modulation of the polarization is focused on linear polarization (having a state of polarization as shown in (a) of FIG. 7), the beams of light that have passed respectively through the optical analyzers 3c and 3b do not contain any primary component of the signal applied by the optical external modulator 11 and they only contain a secondary component of the applied signal. In this case, it is recommendable to cause the beam of light that passes through the optical analyzer 3a to be modulated for the polarization by means of a π/2 phase corrector (e.g., quarter-wavelength plate) to change its state of polarization from d to e in FIG. 5 (or (b) of FIG. 7) before entering the optical analyzer 3a.

A beam of light with a modulated polarization that has a substantially constant elliptic form and a variable angle for the principal axis of ellipse is indicated by e in FIG. 5. In this case, as in the case of (a) of FIG. 4, the optical analyzers do not produce any light with a modulated intensity in operating directions of 45° and 135°. Then, it is recommendable to arrange the quarter-wavelength plate and the optical analyzer 3a in such a way that they show an angular difference of 45.

As is clear from above description, spots where light with a modulated polarization is not detectable depending on the state of polarization of the beams light introduced into the optical analyzer 3a, 3b or 3c (null points) can be eliminated by using a light receiving section having a configuration as described above. In other words, the problem that the optical analyzers 3a, 3b and 3c are not effective for the detection of light with a modulated polarization when their operating directions are found in the direction along which an ultrasonic wave is propagated or a direction perpendicular to that direction (or, more precisely, the direction of polarization of light being propagated that corresponds to that direction) is resolved because at least either the optical analyzer 3c or 3b can detect such light.

On the other hand, the problem that the output of the optical analyzers would be 0 if light with a modulated polarization having an invariable axis of polarization and a mode of modulation focused on liner polarization is introduced to the system is resolved by a combined use of a quarter-wavelength plate and the optical analyzer 3a.

As an apparatus for receiving light with a modulated polarization according to the second aspect of the invention comprises a light receiving section 4 including branching devices 5a and 5b for receiving the incoming light with a modulated polarization into three branched beams of light 6a, 6b and 6c, a phase corrector 2 (e.g., a quarter-wavelength plate) arranged on one of the path of the three branched beams of light, for instance 6a, an optical analyzer 3a arranged downstream to the π/2 phase corrector 2, a pair of optical analyzers 3b and 3c arranged on the respective paths of the remaining branched beams of light 6b and 6c, said π/2 phase corrector 2 and said first optical analyzer forming an angle of 45 therebetween, said second optical analyzer 3b and said third optical analyzer 3c forming an angle of 45° therebetween the modulation signal applied thereto can always be obtained if the optical analyzers 3a, 3b and 3c are rigidly held in place.

DETAILED DESCRIPTION OF THE PREFERRED EMBODIMENTS

Embodiment 1 of Apparatus for Receiving Light with a Modulated Polarization

Figure 1:
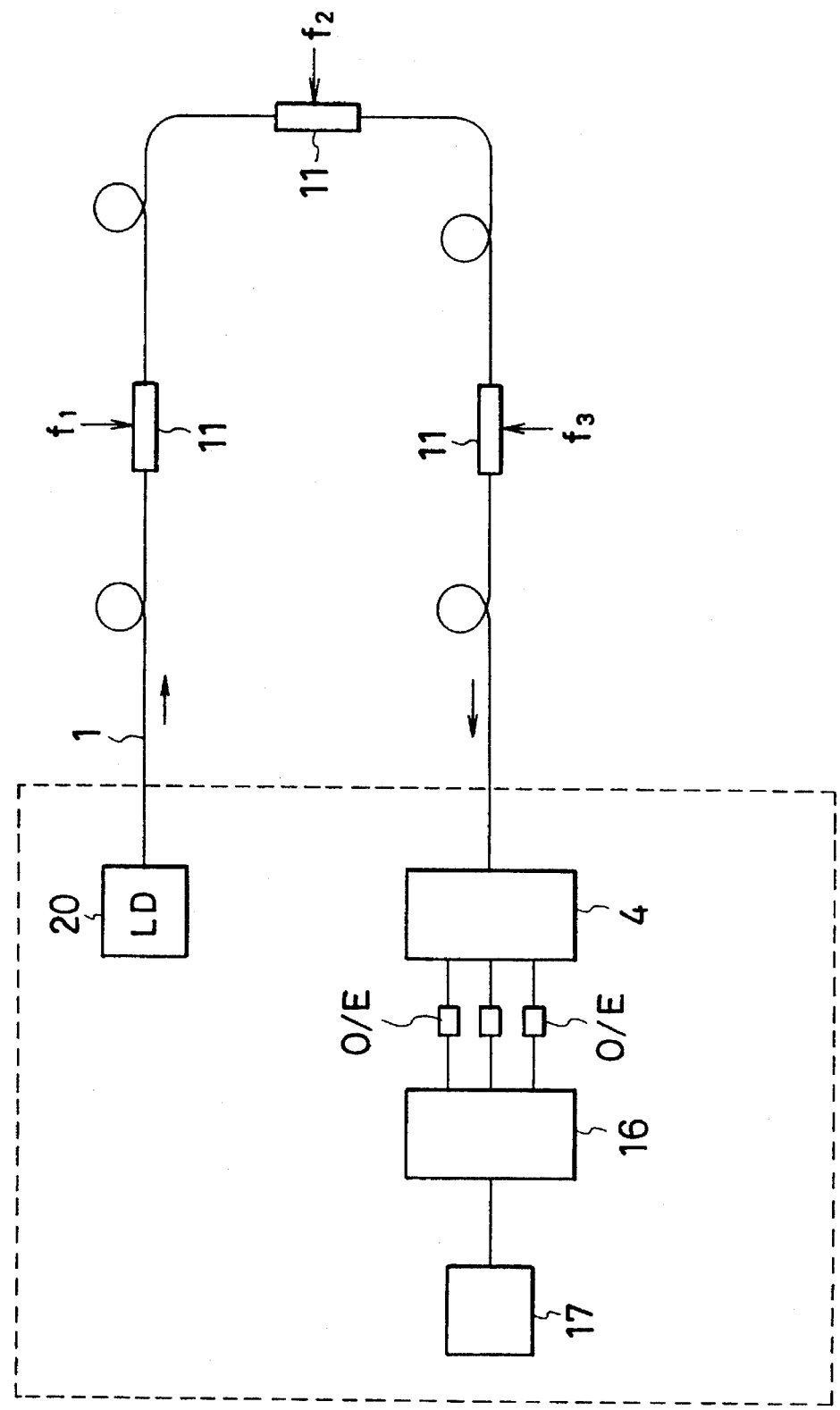
FIG. 1 a schematic block diagram of an embodiment of apparatus for receiving light with a modulated polarization according to the invention.

Now, a first embodiment of apparatus for receiving light with a modulated polarization will be described in detail by referring to FIG. 1 and 2. In FIG. 1, there are shown a light source 20 such as a laser diode (LD), an optical fiber 1 to be used for propagation of light and three optical external modulators 11 for changing (modulating) the polarization of light being propagated through the optical fiber 1 respectively in accordance with applied signals $f_1$, $f_2$ and $f_3$ (modulation signals). Reference numeral 4 in FIG. 1 denotes a branch section for receiving light with a modulated polarization coming from the first, second and third optical external modulators 11.

Figure 2:
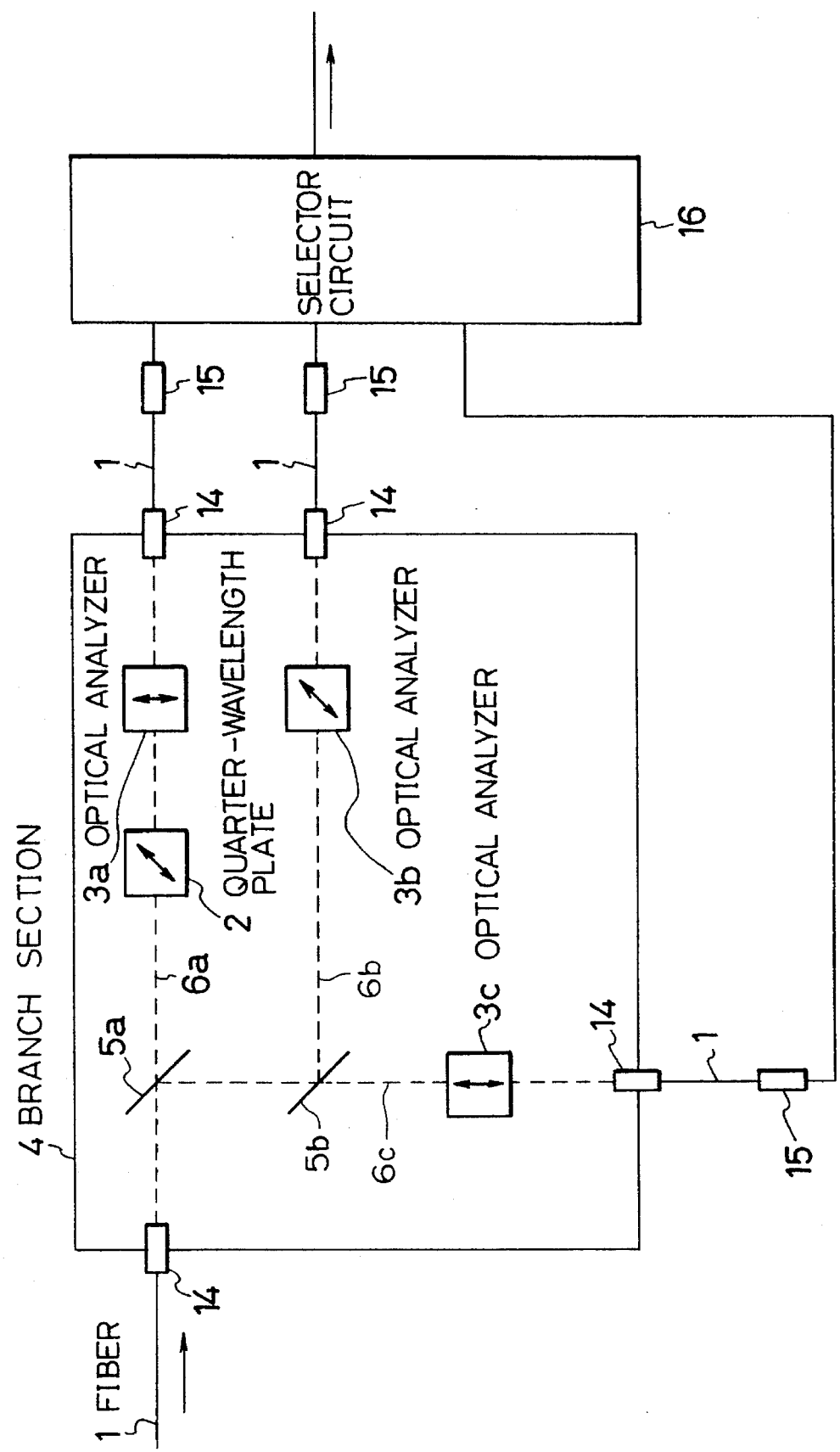
FIG. 2 is a schematic illustration showing a first possible arrangement of the light receiving section of the apparatus for receiving light with a modulated polarization of FIG. 1.

As illustrated in FIG. 2, the branch section 4 comprises a pair of branching devices 5a and 5b (e.g., a half mirror) for dividing the received light with a modulated polarization, a quarter-wavelength plate 2 arranged on one of the three branched optical paths 6a, 6b and 6c, or optical path 6a, an optical analyzer arranged downstream to the quarter-wavelength plate 2 and a pair of optical analyzers 3b and 3c arranged respectively on the remaining branched optical paths 6b and 6c. The operating direction of the first optical analyzer 3a and the main axis of the quarter-wavelength plate 2 are arranged with an angular difference of 45°, whereas the second optical analyzer 3b and the third optical analyzer 3c are arranged also with an angular difference of 45°.

The branching devices 5a and 5b are preferably so arranged that their levels of optical power are substantially equal to each other right in front of the optical analyzers 3a, 3b and 3c, taking the insertion loss of the quarter-wavelength plate 2 arranged upstream to the optical analyzer 3a into consideration.

In FIG. 2, reference numeral 14 denotes collimator lenses arranged respectively at the outputs of the optical analyzers 3a, 3b and 3c and at the input of the light receiving section 4 and reference numeral 15 denotes O/E converters for respectively converting the optical outputs of the collimator lenses 14 into electric signals.

In FIGS. 1 and 2, reference numeral 16 denotes a selection circuit that selects a signal with the highest power level from the outputs of said three O/E converters.

In FIG. 1, reference numeral 17 denotes a processing circuit for processing the signal selected by the selection circuit 16.

Embodiment 2 of Apparatus for Receiving Light with a Modulated Polarization

Figure 3:
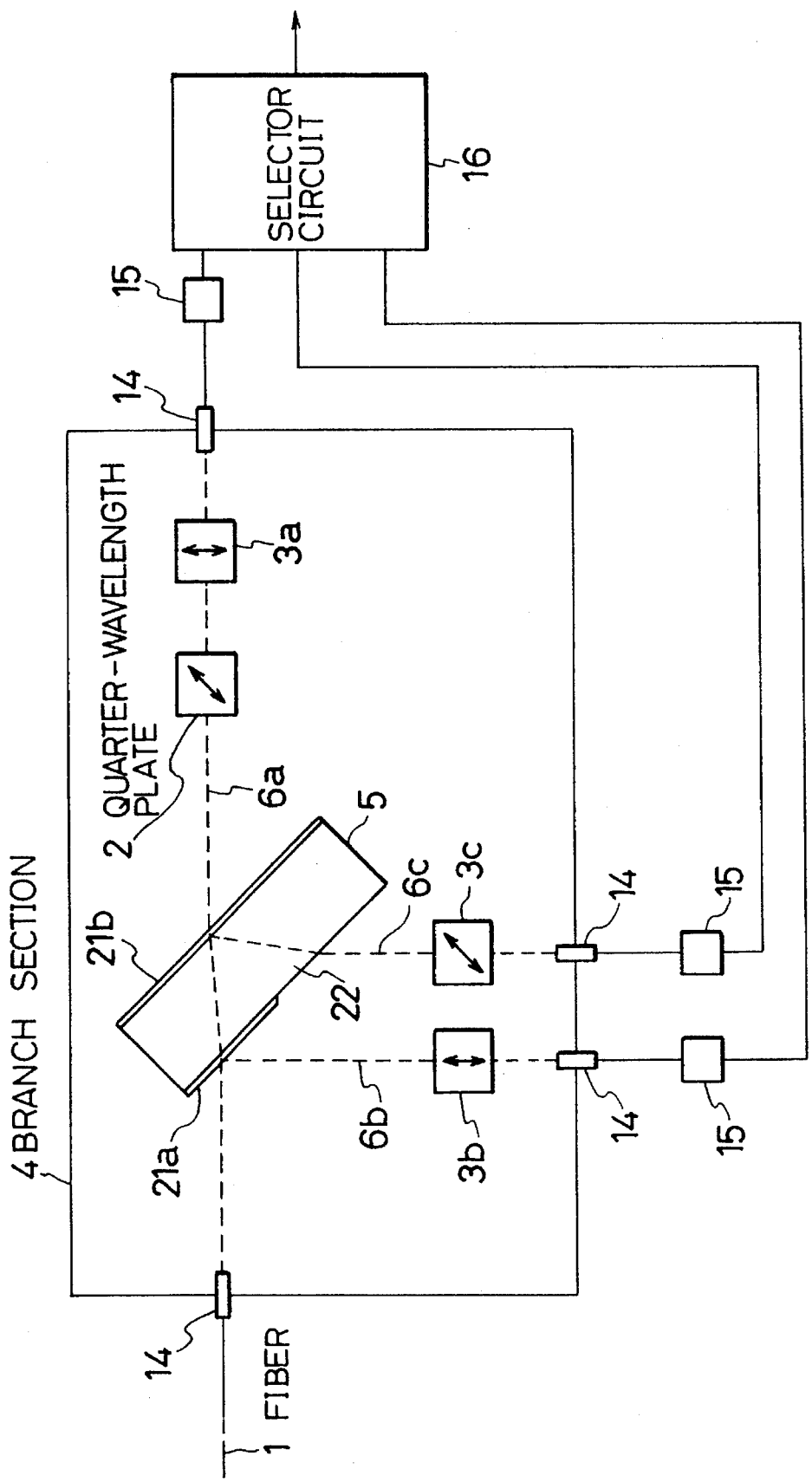
FIG. 3 is a schematic illustration showing a second possible arrangement of the light receiving section of the apparatus for receiving light with a modulated polarization of FIG. 1.

FIG. 3 shows a second embodiment of apparatus for receiving light with a modulated polarization according to the invention. In this embodiment, the half mirror used as branching devices 5a and 5b in the first embodiment is replaced by a block of quartz 22. The branching device 5 is realized by arranging metal films 21a, 22b (such as aluminum films) on the front and rear surfaces of the quartz block 22, respectively, as reflectors by vapor deposition.

With the embodiment of apparatus for receiving light with a modulated polarization, the incident light of the branch section 4 is made to be spherical light after passing through the collimator lens 12 arranged at the input side of the branch section 4 and reflected by the metal film 21a of the branching device 9 to show an intensity that is about one-third of that of the incident light before it reaches the optical analyzer 3b. The remaining light with a modulated polarization is made to enter the branching device 9 by way of the quartz block 22 before it is partly reflected by the metal film 21b and partly transmitted through the metal film 21b to reach the optical analyzers 3c and 3a, respectively. The remaining operation of this embodiment is identical with that of the first embodiment of FIG. 2.

Embodiment 3 of Apparatus for Receiving Light with a Modulated Polarization

Figure 4:
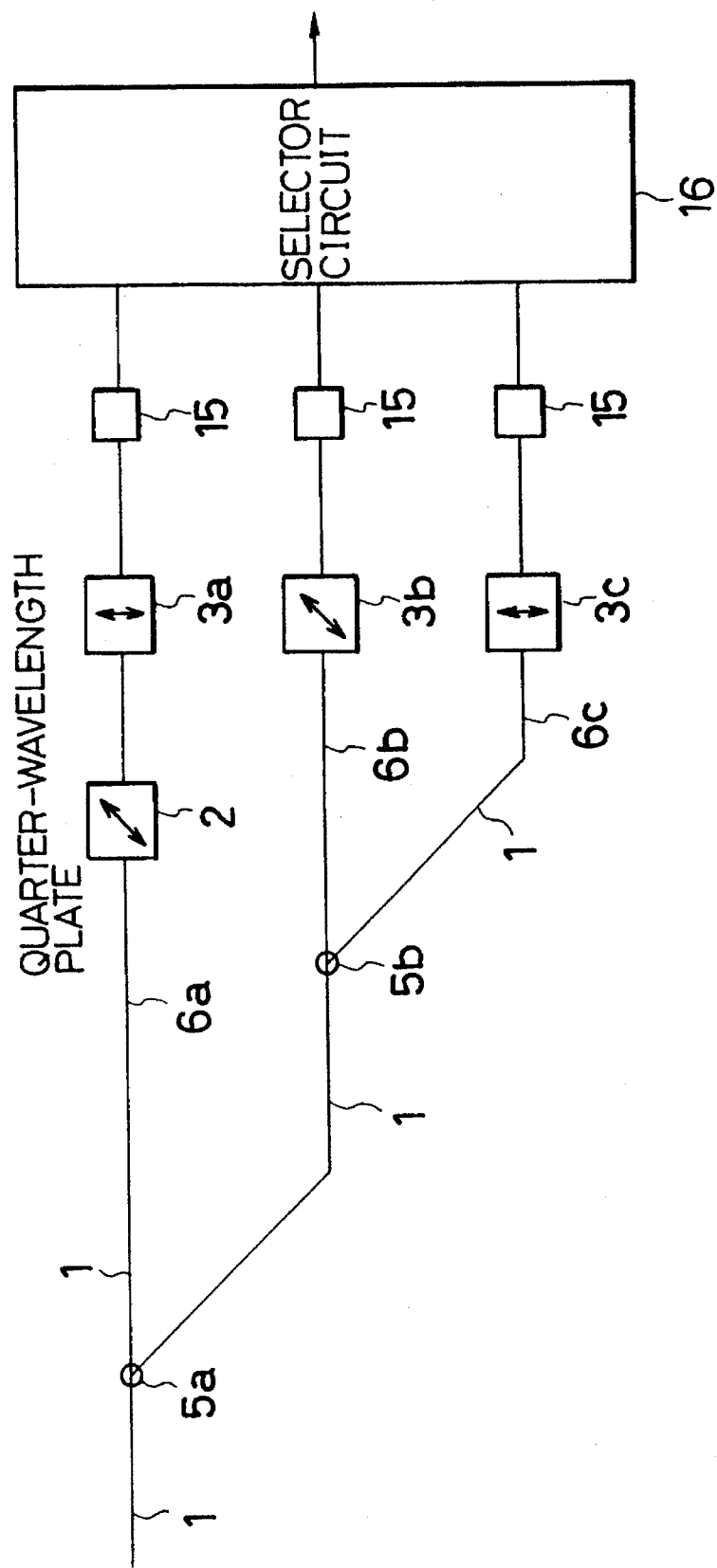
FIG. 4 is a schematic illustration showing a third possible arrangement of the light receiving section of the apparatus for receiving light with a modulated polarization of FIG. 1.
Figure 5:
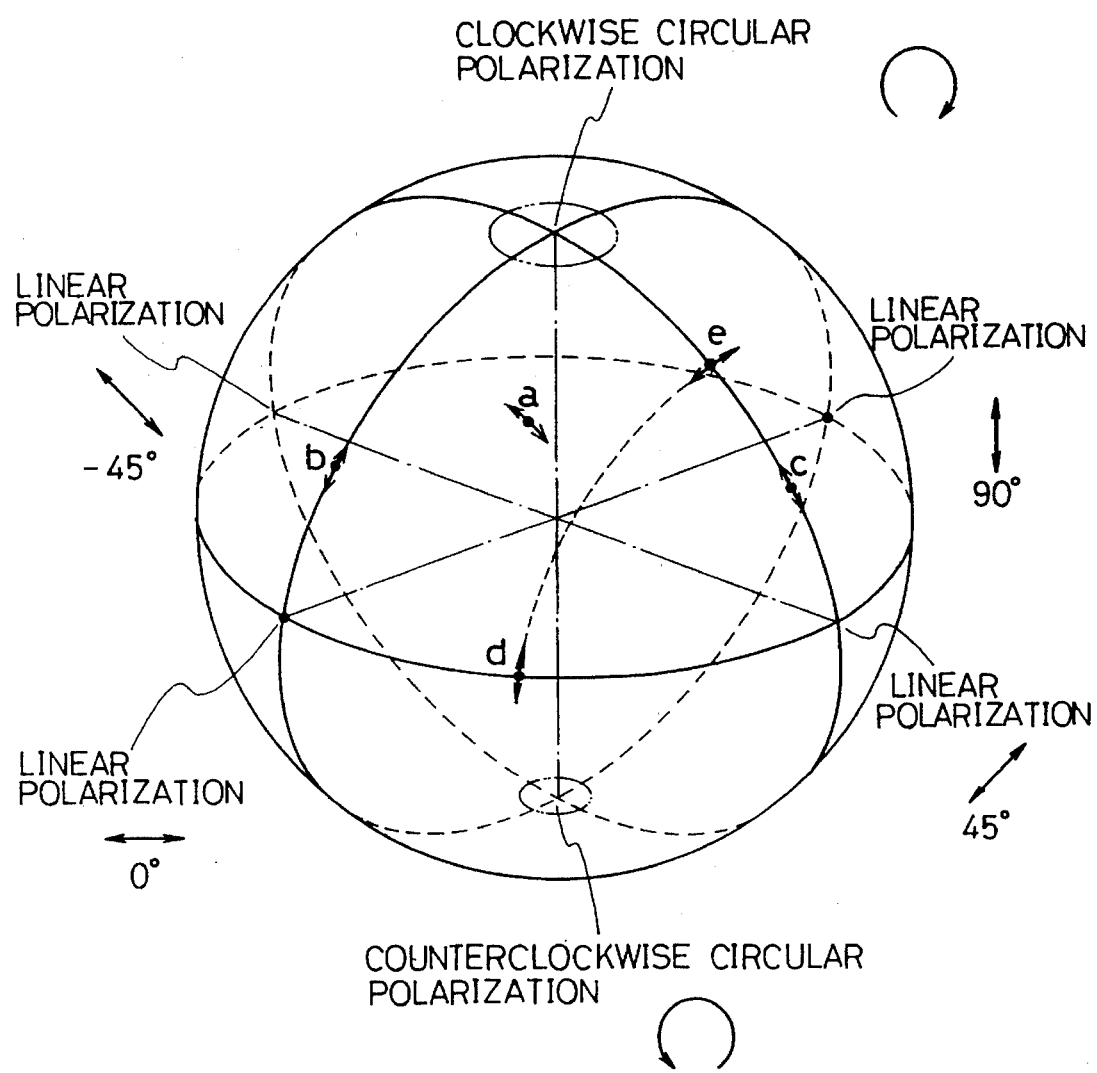
FIG. 5 is a schematic illustration showing states of polarization of light being propagated with a method for receiving light with a modulated polarization according to the invention on a Poincare' sphere.
Figure 6A:
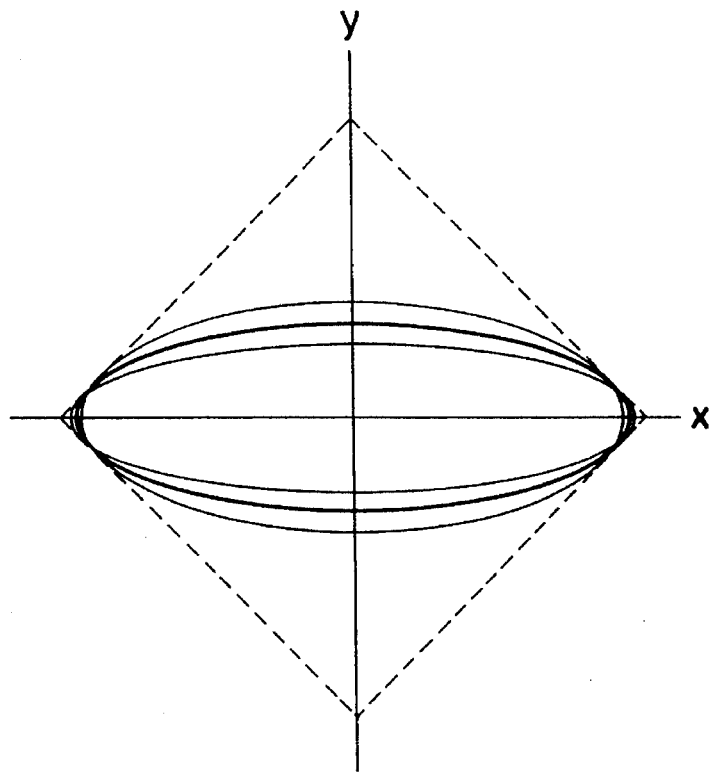
FIGS. 6 is an illustration showing two different directions of polarization of light with a modulated polarization as indicated by (a) and (b).
Figure 6B:
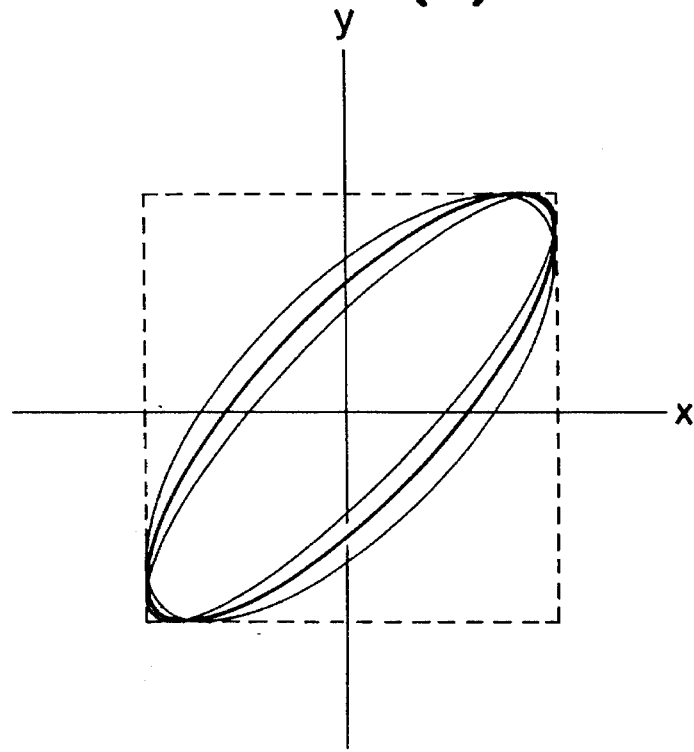
Figure 7A:
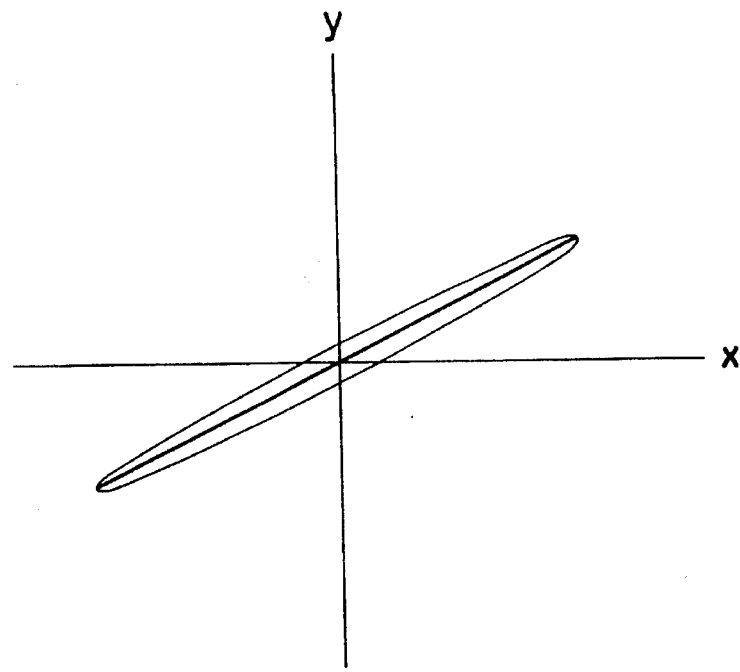
FIGS. 7 is an illustration showing two different directions of polarization of light with a modulated polarization as indicated by (a) and (b) that are still different from those of FIG. 6.
Figure 7B:
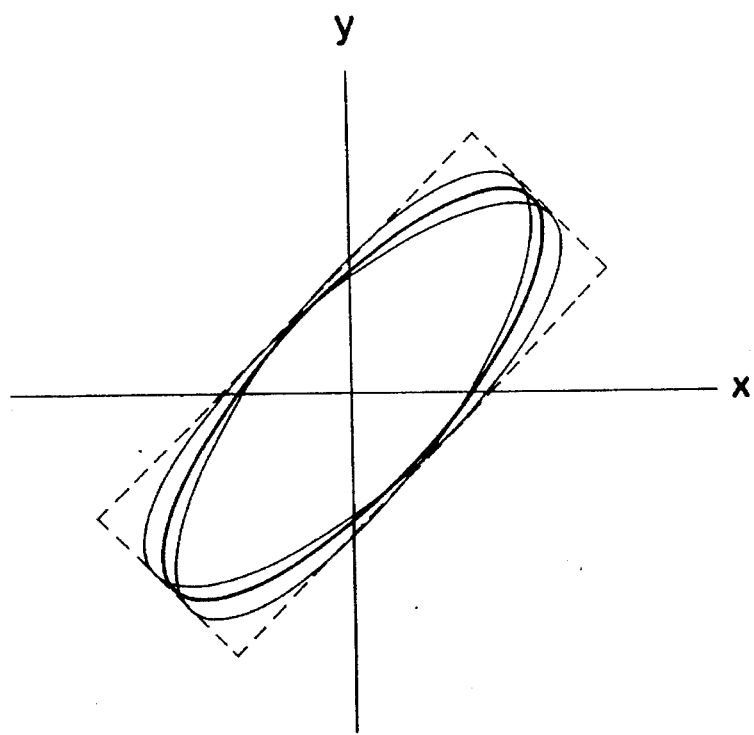
Figure 8A:
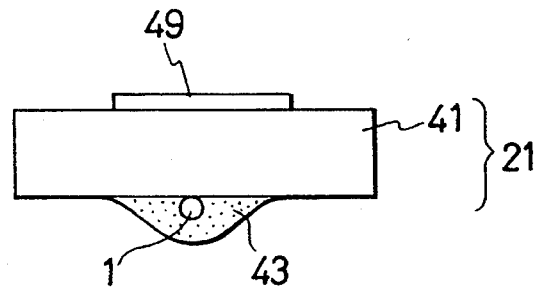
FIGS. 8(a) and 8(b) are schematic illustrations of a conventional system for modulating the polarization, showing two different views thereof.
Figure 8B:
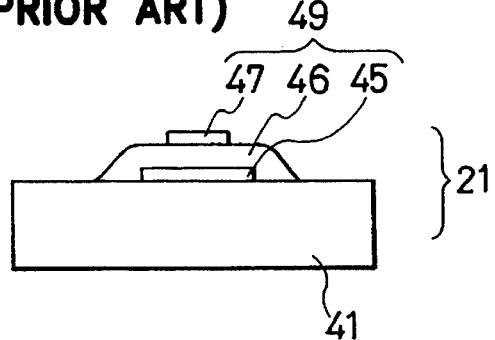
Figure 9:
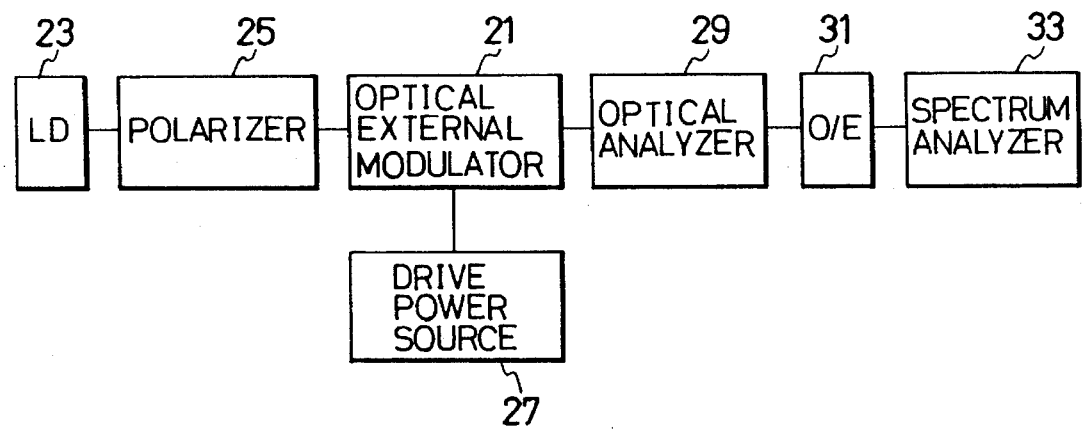
FIG. 9 is a schematic block diagram of a conventional system for transmitting light with a modulated polarization.
Figure 10A:
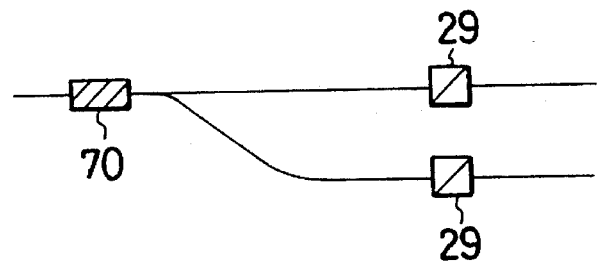
FIGS. 10(a), 10(b) and 10(c) are is a schematic illustrations of a conventional method for receiving light with a modulated polarization, showing three possible arrangements.
Figure 10B:
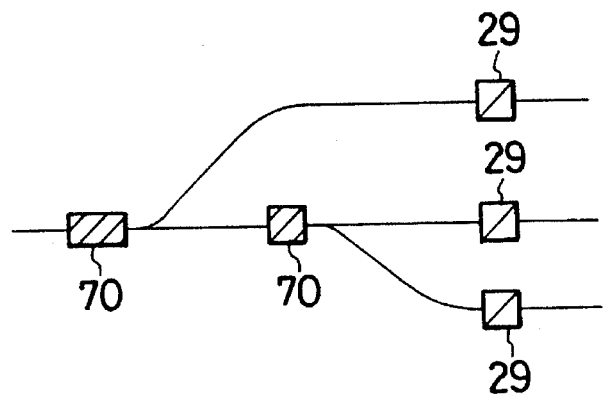
Figure 10C:
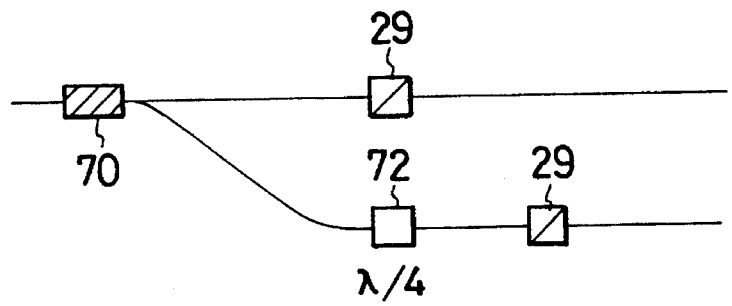

FIG. 4 shows a third embodiment of apparatus for receiving light with a modulated polarization according to the invention. In this embodiment, fusion type optical couplers are used for the branching devices 5a and 5b to divide light with a modulated polarization being propagated through the optical fiber 1. The first optical coupler 5a divides the incoming light into beams with an intensity ratio of 1 to 2, whereas the second optical coupler 5b divides the incoming light into beams with an intensity ratio of 1 to 1 so that the intensities of the three beams of light running through the three optical paths 6a, 6b and 6c are made substantially equal to one another in front of the optical analyzer 3a, 3b and 3c.

A Best Mode of Realization of the Method for Receiving Light with a Modulated Polarization Now a best mode of realization of the method for receiving light with a modulated polarization according to the invention will be described below in connection with the embodiment of apparatus of FIGS. 1 and 2.

Light emitted from the light source 20 of FIG. 1 is propagated through the optical fiber 1. If, under this condition, the first, second and third optical external modulators 11 arranged at the respective positions along the optical fiber 1 are driven to operate by modulation signals $f_1$, $f_2$ and $f_3$, respectively, the light being propagated through the optical fiber 1 is modulated for its polarization.

The light with a modulated polarization is then made to become spherical light by the collimator lens 14 arranged at the input side of the and divided into transmitted light and reflected light by the first branching device 5a, of which the reflected light is further divided into transmitted light and reflected light by the second branching device 5b to produce three beams of light in all. Note that the light transmitted by the first branching device 5a has an intensity of one-third of that of the incident light and is directed to the quarter-wavelength plate 2 while the light reflected by the device 5a has an intensity of two-third of the incident light and is directed to the second branching device 5b.

Thus, of the three beams of light with a modulated polarization, the one traveling through the branched optical path 6a is then made to pass the quarter-wavelength plate 2 and the optical analyzer 3a to become light with a modulated intensity and thereafter made to enter the optical fiber 1 by the corresponding collimator lens 14 as spherical light before it is converted into an electric signal by the corresponding O/E converter 19 and forwarded Lo the selection circuit 16.

Of the three beams of light with a modulated polarization, the ones traveling through the respective branched optical paths 6b and 6c are then made to become light with a modulated intensity by means of the optical analyzers 3b and 3c respectively and enter the optical fiber 1 by the corresponding collimator lenses 14 as spherical light before they are converted into respective electric signals by the appropriate O/E converters 15 and forwarded to the selection circuit 16.

As described earlier, at least one of the three beams of light with a modulated intensity contains the signal applied thereto by the corresponding one of the optical external modulators 11, while it is traveling through the optical fiber 1.

The selection circuit 16 of FIG. 2 compares the levels of the signal contained in the three incoming beams and sends out the one with the highest level of the signal. Alternatively, the selection circuit 16 may be so arranged that it sends out the sum of the levels of the signal contained in the three beams. If such is the case, however, case should be taken to see if the phases of the beams do not interfere with one another to offset the levels of the signal contained therein. The output of the selection circuit 16 may advantageously be subjected to an AGC (automatic gain control) process to hold the output signal to a constant level so that the succeeding operations for processing the output signal may be handled with ease.

The output signal of the selection circuit is processed by the processing circuit 17.

As described above in detail, light with a modulated polarization can be detected with a method according to the invention regardless of the state of polarization of the light. Note that the arrangement of the three optical analyzers 3a, 3b and 3c is not limited to the above embodiments and may appropriately be modified so long as it does not depart from the spirit and the scope of the present invention.

Advantages of the Invention

With a method for receiving light with a modulated polarization according to the first aspect of the invention, light with a modulated polarization can always be detected, regardless of the optical analyzers 3a, 3b and 3c are rigidly held in place.

An apparatus for receiving light with a modulated polarization according to the second aspect of the invention can always obtain a modulated signal, regardless of the optical analyzers 3a, 3b and 3c being rigidly held in place. Additionally, such an apparatus has a simple configuration.

What is claimed is:

1. A method for receiving light with a modulated polarization comprising steps of dividing the light being propagated through an optical fiber (1) with a polarization calculated in accordance with a modulation signal into three branched beams, causing one of the branched beams of light with a modulated polarization to pass through a π/2 phase corrector (2) and a first optical analyzer (3a) and causing the remaining branched beams of light to respectively pass through the second and third optical analyzers (3b and 3c) without passing through any π/2 phase correctors (2) before in order to receive light with a modulated intensity from the optical analyzers (3a, 3b and 3c).

2. An apparatus for receiving light with a modulated polarization comprising a light receiving section (4) including branching devices (5a and 5b) for dividing the light with a modulated polarization being propagated through an optical fiber (1) into three branched beams of light (6a, 6b and 6c), a π/2 phase corrector (2) arranged on one of the path of one of the three branched beams of light, an optical analyzer (3a) arranged downstream to the π/2 phase corrector (2), a pair of optical analyzers (3b and 3c) arranged on the respective paths of the remaining branched beams of light (6b and 6c), said π/2 phase corrector (2) and said first optical analyzer (3a) forming an angle of 45° therebetween, said second optical analyzer (3b) and said third optical analyzer (3c) forming an angle of 45° therebetween.

\* \* \* \* \*